(12) United States Patent
Carella et al.

(10) Patent No.: US 10,968,362 B2
(45) Date of Patent: Apr. 6, 2021

(54) FLUORINATED SURFACTANT-FREE AQUEOUS DISPERSION OF A VINYLIDENE FLUORIDE COPOLYMER COMPRISING HYDROXYL GROUPS

(71) Applicant: SOLVAY SPECIALTY POLYMERS ITALY S.P.A., Bollate (IT)

(72) Inventors: Serena Carella, Parabiago (IT); Elena Molena, Bollate (IT); Maurizio Biso, Milan (IT); Giulio Brinati, Milan (IT)

(73) Assignee: SOLVAY SPECIALTY POLYMERS ITALY S.P.A., Bollate (IT)

( * ) Notice: Subject to any disclaimer, the term of this patent is extended or adjusted under 35 U.S.C. 154(b) by 96 days.

(21) Appl. No.: 16/318,128

(22) PCT Filed: Jul. 12, 2017

(86) PCT No.: PCT/EP2017/067482
§ 371 (c)(1),
(2) Date: Jan. 15, 2019

(87) PCT Pub. No.: WO2018/011244
PCT Pub. Date: Jan. 18, 2018

(65) Prior Publication Data
US 2019/0284428 A1    Sep. 19, 2019

(30) Foreign Application Priority Data
Jul. 15, 2016 (EP) .................................... 16179636

(51) Int. Cl.
| | |
|---|---|
| *H01M 2/14* | (2006.01) |
| *H01M 2/16* | (2006.01) |
| *C08F 214/22* | (2006.01) |
| *C09D 5/24* | (2006.01) |
| *C09D 127/16* | (2006.01) |

(52) U.S. Cl.
CPC ........ *C09D 127/16* (2013.01); *C08F 214/225* (2013.01); *C09D 5/24* (2013.01); *H01M 2/145* (2013.01); *H01M 2/166* (2013.01); *H01M 2/1686* (2013.01)

(58) Field of Classification Search
CPC ....... C09D 127/16; C09D 5/24; H01M 2/166; H01M 2/145; H01M 2/1686; C08F 215/225
See application file for complete search history.

(56) References Cited

U.S. PATENT DOCUMENTS

| | | | |
|---|---|---|---|
| 5,880,204 A | 3/1999 | McCarthy et al. | |
| 2010/0133482 A1* | 6/2010 | Abusleme | B01D 71/76 |
| | | | 252/511 |

FOREIGN PATENT DOCUMENTS

| | | |
|---|---|---|
| EP | 791973 A2 | 8/1997 |
| WO | 2008129041 A1 | 10/2008 |
| WO | 2013010936 A1 | 1/2013 |
| WO | 2013120858 A1 | 8/2013 |
| WO | 2014095907 A1 | 6/2014 |
| WO | 2015059155 A1 | 4/2015 |
| WO | 2016003748 A1 | 1/2016 |

OTHER PUBLICATIONS

Pianca, M. et al., "End groups in fluoropolymers", Journal of Fluorine Chemistry, 1999, vol. 95, pp. 71-84—Elsevier Science SA.
Standard ASTM D3835-08, "Standard Test Method for Determination of Properties of Polymeric Materials by Means of a Capillary Rheometer", ASTM International, 2008, 11 pages.

* cited by examiner

*Primary Examiner* — Robert D Harlan
(74) *Attorney, Agent, or Firm* — Osha Bergman Watanabe & Burton LLP

(57) ABSTRACT

The present invention pertains to a fluorosurfactant free aqueous dispersion of an acrylic-modified vinylidene fluoride polymer, possessing a melt viscosity of at least 30 kPoise, and possessing an amount of end groups of formula —$CH_2$—OH of at least 5 mmol/kg, to a method for its preparation and to its use for the manufacture of electrochemical cell components, such as electrodes and/or composite separators.

20 Claims, No Drawings

FLUORINATED SURFACTANT-FREE AQUEOUS DISPERSION OF A VINYLIDENE FLUORIDE COPOLYMER COMPRISING HYDROXYL GROUPS

CROSS-REFERENCE TO RELATED APPLICATION

This application is a U.S. national stage entry under 35 U.S.C. § 371 of International Application No. PCT/EP2017/067482 filed Jul. 12, 2017, which claims priority to European application No. EP 16179636.2 filed on Jul. 15, 2016. The entire contents of these applications are explicitly incorporated herein by this reference.

TECHNICAL FIELD

The present invention pertains to a vinylidene fluoride polymer aqueous dispersion, to a method for its preparation and to its use for the manufacture of electrochemical cell components, such as electrodes and/or composite separators.

BACKGROUND ART

Vinylidene fluoride (VDF) polymers are known in the art to be suitable as binders for the manufacture of electrodes and/or composite separators, and/or as coatings of porous separators for use in non-aqueous-type electrochemical devices such as batteries, preferably secondary batteries, and electric double layer capacitors.

Leading materials which are available in the marketplace for this field of use are VDF polymers powders which may be modified by incorporation of polar groups, and which are processed by dissolution in solvent systems which generally comprises N-methyl pyrrolidone or mixtures of N-methyl pyrrolidone and a diluting solvent such as acetone, propyl acetate, methyl ethyl ketone and ethyl acetate. Exemplary materials are e.g. disclosed in EP 2147029 A (SOLVAY SOLEXIS SPA) 27 Jan. 2010 provide for linear semi-crystalline copolymers comprising recurring units derived from vinylidene fluoride (VDF) monomer and at least one hydrophilic (meth)acrylic monomer, having improved thermal stability and delivering outstanding cohesion when used as binder in batteries.

While technologies based on the dissolution in an organic solvent of VDF polymers have been pursued, the interest in water-borne dispersions is increasing, driven by both economic and environmental aspects. To effectively employ waterborne polymer compositions in electrode- or separator-forming processes, it is important to develop systems notably having sufficient stability prior and after admixing with e.g. powdery electrode material or fillers, suitable filmability and processing characteristics for being advantageously applied onto required support (e.g. metal collector) via standard techniques and for yielding a uniform layer. Most importantly, these binder systems should provide proper cohesion within the hosted particles and proper adhesion of the same to the support after drying.

Further, in the area of VDF polymers powders, it has been generally recognized that a high molecular weight is beneficial for this field of use. Notably, EP 0791973 A (KUREHA) 27 Aug. 1997 pertains to a binder solution for providing an electrode suitable for use in non-aqueous-type electrochemical devices, such as a battery and an electric double layer capacitor, which is formed by dissolving a vinylidene fluoride polymer having an inherent viscosity (and thus a polymerization degree) higher than a conventional level in an organic solvent. An electrode-forming composition is formed by dispersing powdery electrode material in the binder solution and is applied onto an electroconductive substrate, followed by drying, to form a composite electrode layer, which retains the powdery electrode material at a smaller amount of vinylidene fluoride polymer than a conventional level and is well resistant to a non-aqueous electrolytic solution.

In this field, hence, a continuous quest exists for aqueous dispersions of VDF polymers possessing all required properties for being used in the field of components for secondary batteries, including notably ability to deliver cohesion with electrode active materials and/or with composite separators' inorganic fillers, ability to ensure adhesion to metal collectors, separator porous substrates, stability/non-dissolution towards liquid electrolyte solutions and prevention of contamination with chemicals possibly interfering with electrochemical reactions (e.g. fluorosurfactant having not sufficient electrochemical stability), while yet possessing adequate properties for processing, including shear stability during formulation and casting, acceptable shelf life.

Now, techniques for manufacturing VDF dispersions are generally based on aqueous emulsion polymerization, generally in the presence of fluorinated emulsifiers, which are generally difficult to be removed from resulting dispersions, and which may have detrimental effects as contaminants in electrochemical devices parts. While attempts to reduce or even eliminate fluorosurfactants in emulsion polymerization of VDF so as to deliver stable VDF polymers dispersions free therefrom are known, those techniques are understood to be based to self-stabilization of polymer chains through end groups' chemistry. Increasing molecular weight would reduce hence overall concentration of chain ends, leading hence to lack of stabilization phenomena.

U.S. Pat. No. 5,880,204 (ALLIED SIGNAL INC) 9 Mar. 1999 discloses room temperature coalesceable aqueous fluoropolymer dispersions comprising particles of a block copolymer having a first semi-crystalline block and a second amorphous block, wherein first and second block are generally VDF or CTFE copolymers, and second block comprises generally a so-called "cure-site provider", which can be notably an acid such as acrylic acid. Generally the fluoropolymer, as a whole, possesses Mw of 10,000 to 1,000,000 (hence ranging from low to extremely high molecular weight). These dispersions are taught useful as floor polishes. Generally, latices are prepared in the absence of surfactants, using a redox initiating system at relatively low polymerization temperature.

WO 2013/010936 (SOLVAY SPECIALTY POLYMERS ITALY SPA) 24 Jan. 2013 pertains to an aqueous composition comprising: (A) an aqueous latex comprising at least one vinylidene fluoride (VDF) polymer [polymer (F)] comprising recurring units derived from vinylidene fluoride (VDF) and at least one (meth)acrylic monomer (MA) which is preferably AA, (B) at least one powdery electrode material, and (C) optionally, less than 10 percent by weight, based on the total weight of the aqueous composition, of at least one organic solvent (S), wherein the polymer (F) in the aqueous latex is under the form of primary particles having an average primary particle size of less than 1 µm, as measured according to ISO 13321. This document also pertains to a process for manufacturing an electrode using said aqueous composition, to an electrode comprising a metal substrate coated on at least one surface with said aqueous composition and to use of said electrode for manufacturing a non-aqueous-type electrochemical device. The latices are prepared by aqueous emulsion polymerization at pressure of 20 to 70 bar and temperatures of 60 to 135° C., preferably 90 to 130° C., in the presence of a microemulsion or of a fluorosurfactant.

WO 2015/059155 (SOLVAY SA) 30 Apr. 2015 is directed to an electrode-forming composition comprising: (a) an aqueous latex comprising at least one fluoropolymer [polymer (F)] comprising recurring units derived from vinylidene fluoride (VDF), at least one hydrogenated monomer, which is preferably AA, and, optionally, at least one other fluorinated monomer different from VDF, and, homogeneously dispersed therein, (b) at least one powdery electrode-forming material consisting of Sulphur, (c) at least one powdery electrically conducting material, wherein the polymer (F) in the aqueous latex is under the form of primary particles having an average primary particle size of less than 1 µm, as measured according to ISO 13321. This document also pertains to a process for the manufacture of said composition and to use of said composition in a process for the manufacture of a positive electrode for a Lithium-Sulphur battery. The latices are prepared by aqueous emulsion polymerization at pressure of 20 to 70 bar and temperatures of 60 to 135° C., preferably 90 to 130° C., possibly in the presence of a micro-emulsion or a fluorosurfactant.

WO 2008/129041 (SOLVAY SOLEXIS SPA) 30 Oct. 2008 is directed to a linear semi-crystalline copolymer comprising recurring units derived from vinylidene fluoride (VDF) monomer and at least one hydrophilic (meth)acrylic monomer which is statistically distributed in the polymer chain, and to a method for its manufacture by suspension polymerization combined with step-wise addition of acrylic monomer.

WO 2013/120858 (SOLVAY SPECIALTY POLYMERS ITALY SPA) 22 Aug. 2013 is directed to a process for the manufacture of a composite separator for an electrochemical cell, said process comprising the following steps: (i) providing a substrate layer; (ii) providing a coating composition comprising:
an aqueous latex comprising at least one VDF polymer latex, and
at least one non-electroactive inorganic filler material;
(iii) applying said coating composition onto at least one surface of said substrate layer to provide a coating composition layer; and
(iv) drying said coating composition layer.

WO 2014/095907 (SOLVAY SPECIALTY POLYMERS ITALY SPA) 26 Jun. 2014 pertains to a process for the manufacture of a dense film, said process comprising providing a solid composition of a VDF fluoropolymer comprising carboxylic groups and at least one PAO; and processing said mixture in molten phase thereby providing a dense film, which can be used as dense separator in electrochemical devices.

There is a continuous shortfall in the art for aqueous dispersions of polar modified VDF polymers which possess improved performances in Li batteries' application, but which yet possess substantial latex stability to deliver appropriate shelf life and processability.

SUMMARY OF INVENTION

The Applicant has now found that a solution to the above defined problem is provided by an aqueous dispersion [dispersion (D)] comprising particles of a vinylidene fluoride (VDF) copolymer [polymer (A)] comprising recurring units derived from vinylidene fluoride (VDF) monomer and recurring units derived from at least one hydrophilic (meth) acrylic monomer (MA) of formula:

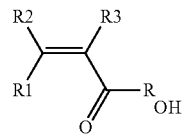

wherein each of R1, R2, R3, equal or different from each other, is independently an hydrogen atom or a $C_1$-$C_3$ hydrocarbon group, and $R_{OH}$ is a hydroxyl group or a $C_1$-$C_5$ hydrocarbon moiety comprising at least one hydroxyl group, said polymer (A)

(i) comprising more than 85.0% moles of recurring units derived from VDF and from 0.05 to 10% by moles of recurring units derived from said hydrophilic (meth)acrylic monomer (MA), with respect to the total number of recurring units of polymer (A);

(ii) possessing a melt viscosity of at least 30 kPoise, when determined at a shear rate of 100 sec$^{-1}$, and at a temperature of 230° C., according to ASTM D3835, and (iii) possessing an amount of end groups of formula —$CH_2$—OH of at least 5 mmol/kg and at most 20 mmol/kg;

wherein said dispersion (D) is substantially free from fluorinated surfactants.

The invention further pertains to a method of making the said dispersion (D), said method comprising emulsion polymerization of VDF and said hydrophilic (meth)acrylic monomer (MA) in the presence of a persulfate inorganic initiator, at a temperature of at most 80° C., under a pressure of at least 20 bar, without adding any fluorinated surfactant.

The Applicant has surprisingly found that this manufacturing method enables producing a dispersion possessing sufficient stability against coagulation, so as to ensure adequate shelf-life and processability in the absence of fluorinated surfactants, while achieving high molecular weight of resulting modified VDF polymer, so as to provide for outstanding behaviour in electrochemical cell components' field of use.

DESCRIPTION OF EMBODIMENTS

Polymer (A) comprises recurring units derived from derived from vinylidene fluoride (VDF) and from at least one hydrophilic (meth)acrylic monomer (MA).

The polymer (A) may further comprise recurring units derived from at least one other comonomer (C) different from VDF and from monomer (MA), as above detailed.

The comonomer (C) can be either a hydrogenated comonomer [comonomer (H)] or a fluorinated comonomer [comonomer (F)].

By the term "hydrogenated comonomer [comonomer (H)]", it is hereby intended to denote an ethylenically unsaturated comonomer free of fluorine atoms.

Non-limitative examples of suitable hydrogenated comonomers (H) include, notably, ethylene, propylene, vinyl monomers such as vinyl acetate, as well as styrene monomers, like styrene and p-methylstyrene.

By the term "fluorinated comonomer [comonomer (F)]", it is hereby intended to denote an ethylenically unsaturated comonomer comprising at least one fluorine atom.

The comonomer (C) is preferably a fluorinated comonomer [comonomer (F)].

Non-limitative examples of suitable fluorinated comonomers (F) include, notably, the followings:

(a) $C_2$-$C_8$ fluoro- and/or perfluoroolefins such as tetrafluoroethylene (TFE), hexafluoropropylene (HFP), pentafluoropropylene and hexafluoroisobutylene;

(b) $C_2$-$C_8$ hydrogenated monofluoroolefins such as vinyl fluoride, 1,2-difluoroethylene and trifluoroethylene;

(c) perfluoroalkylethylenes of formula $CH_2=CH-R_{f0}$, wherein $R_{f0}$ is a $C_1$-$C_6$ perfluoroalkyl group;

(d) chloro- and/or bromo- and/or iodo-$C_2$-$C_6$ fluoroolefins such as chlorotrifluoroethylene (CTFE);

(e) (per)fluoroalkylvinylethers of formula $CF_2=CFOR_{f1}$, wherein $R_{f1}$ is a $C_1$-$C_6$ fluoro- or perfluoroalkyl group, e.g. $-CF_3$, $-C_2F_5$, $-C_3F_7$;

(f) (per)fluoro-oxyalkylvinylethers of formula $CF_2=CFOX_0$, wherein $X_0$ is a $C_1$-$C_{12}$ oxyalkyl group or a $C_1$-$C_{12}$ (per)fluorooxyalkyl group having one or more ether groups, e.g. perfluoro-2-propoxy-propyl group;

(g) fluoroalkyl-methoxy-vinylethers of formula $CF_2=CFOCF_2OR_{f2}$, wherein $R_{f2}$ is a $C_1$-$C_6$ fluoro- or perfluoroalkyl group, e.g. $-CF_3$, $-C_2F_5$, $-C_3F_7$ or a $C_1$-$C_6$ (per)fluorooxyalkyl group having one or more ether groups, e.g. $-C_2F_5-O-CF_3$;

(h) fluorodioxoles of formula:

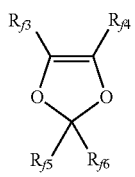

wherein each of $R_{f3}$, $R_{f4}$, $R_{f5}$ and $R_{f6}$, equal to or different from each other, is independently a fluorine atom, a $C_1$-$C_6$ fluoro- or per(halo)fluoroalkyl group, optionally comprising one or more oxygen atoms, e.g. $-CF_3$, $-C_2F_5$, $-C_3F_7$, $-OCF_3$, $-OCF_2CF_2OCF_3$.

Most preferred fluorinated comonomers (F) are tetrafluoroethylene (TFE), trifluoroethylene (TrFE), chlorotrifluoroethylene (CTFE), hexafluoropropylene (HFP), perfluoromethyl vinyl ether (PMVE), perfluoropropyl vinyl ether (PPVE) and vinyl fluoride, and among these, HFP is most preferred.

Should at least one comonomer (C) (preferably HFP) be present, the polymer (A) comprises typically from 0.05% to 14.5% by moles, preferably from 1.0% to 13.0% by moles, of recurring units derived from said comonomer(s) (C), with respect to the total moles of recurring units of polymer (A).

However, it is necessary that the amount of recurring units derived from vinylidene fluoride in the polymer (A) is at least 85.0 mol %, preferably at least 86.0 mol %, more preferably at least 87.0 mol %, so as not to impair the excellent properties of vinylidene fluoride resin, such as chemical resistance, weatherability, and heat resistance. For instance, when polymer (A) comprises an amount of VDF units of less than 85.0 mol %, it cannot be used for formulating coating compositions for making composite separators for batteries, as the corresponding polymer would dissolve in the liquid solvent used as electrolyte liquid phase.

The term "at least one hydrophilic (meth)acrylic monomer (MA)" is understood to mean that the polymer (A) may comprise recurring units derived from one or more than one hydrophilic (meth)acrylic monomer (MA) as above described. In the rest of the text, the expressions "hydrophilic (meth)acrylic monomer (MA)" and "monomer (MA)" are understood, for the purposes of the present invention, both in the plural and the singular, that is to say that they denote both one or more than one hydrophilic (meth)acrylic monomer (MA).

According to certain embodiments, polymer (A) consists essentially of recurring units derived from VDF, and from monomer (MA).

According to other embodiments, polymer (A) consists essentially of recurring units derived from VDF, from HFP and from monomer (MA).

Polymer (A) may still comprise other moieties such as defects, end-groups and the like, which do not affect nor impair its physico-chemical properties.

The hydrophilic (meth)acrylic monomer (MA) preferably complies formula:

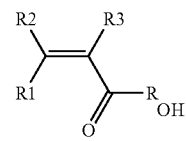

wherein each of R1, R2, $R_{OH}$ have the meanings as above defined, and R3 is hydrogen; more preferably, each of R1, R2, R3 are hydrogen, while $R_{OH}$ has the same meaning as above detailed.

Non limitative examples of hydrophilic (meth)acrylic monomers (MA) are notably acrylic acid, methacrylic acid, hydroxyethyl (meth)acrylate, hydroxypropyl(meth)acrylate; hydroxyethylhexyl(meth)acrylates.

The monomer (MA) is more preferably selected among: hydroxyethylacrylate (HEA) of formula:

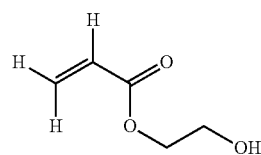

2-hydroxypropyl acrylate (HPA) of either of formulae:

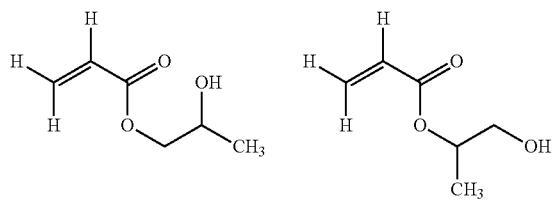

acrylic acid (AA) of formula:

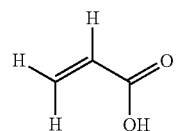

and mixtures thereof.

More preferably, the monomer (MA) is AA and/or HEA, even more preferably is AA.

Determination of the amount of (MA) monomer recurring units in polymer (A) can be performed by any suitable method. Mention can be notably made of acid-base titration methods, well suited e.g. for the determination of the acrylic acid content, of NMR methods, adequate for the quantification of (MA) monomers comprising aliphatic hydrogens in side chains (e.g. HPA, HEA), of weight balance based on total fed (MA) monomer and unreacted residual (MA) monomer during polymer (A) manufacture.

Polymer (A) comprises preferably at least 0.1, more preferably at least 0.2% moles of recurring units derived from said hydrophilic (meth)acrylic monomer (MA) and/or polymer (A) comprises preferably at most 10, more preferably at most 7.5% moles, even more preferably at most 5% moles, most preferably at most 3% moles of recurring units derived from said hydrophilic (meth)acrylic monomer (MA).

Generally, particles of polymer (A) possess a primary particle average size of less than 1 µm. For the purpose of the present invention, the term "primary particles" is intended to denote primary particles of polymer (A) deriving directly from aqueous emulsion polymerization, without isolation of the polymer from the emulsion (i.e. the latex). Primary particles of polymer (A) are thus to be intended distinguishable from agglomerates (i.e. collection of primary particles), which might be obtained by recovery and conditioning steps of such polymer manufacture such as concentration and/or coagulation of aqueous latexes of the polymer (A) and subsequent drying and homogenization to yield the respective powder.

The dispersion (D) of the invention is thus distinguishable from an aqueous slurry that can be prepared by dispersing powders a polymer in an aqueous medium. The average particle size of powders of a polymer or copolymer dispersed in an aqueous slurry is typically higher than 1 µm, as measured according to ISO 13321.

Preferably, the primary particles average size of the particles of polymer (A) in dispersion (D) is above 20 nm, more preferably above 30 nm, even more preferably above 50 nm, and/or is below to 600 nm, more preferably below 400 and even more preferably below 350 nm as measured according to ISO 13321.

As above said, polymer (A) possesses a melt viscosity (MV) of at least 30 kPoise, when determined at a shear rate of 100 sec$^{-1}$, and at a temperature of 230° C., according to ASTM D3835. The MV of polymer (A) is not particularly limited, but it is generally understood that MV of no more than 100 kPoise, preferably less than 80 kPoise will be adequate for ensuring optimal properties in electrochemicals' applications.

Furthermore, the polymer (A) is required to comprise an amount of polar end groups of formula —CH$_2$—OH of at least 5 mmol/kg, when determined by $^1$H-NMR according to PIANCA, Maurizio, et al. End Groups in fluoropolymers. *Journal of Fluorine Chemistry*. 1999, vol. 95, p. 71-84.

The Applicant has surprisingly found that a delicate equilibrium between high molecular weight and number of polar end groups has to be fulfilled, as required in the dispersion (D) for ensuring appropriate colloidal stability.

In preferred embodiments, the polymer (A) comprises an amount of polar end groups of formula —CH$_2$—OH of at least 5 mmol/kg, and/or advantageously at most 18 mmol/kg, preferably at most 15 mmol/kg, even more preferably at most 12 mmol/kg.

Excellent results have been obtained when the polymer (A) comprised an amount of polar end groups of formula —CH$_2$—OH of at least 5 mmol/kg, and at most 10 mmol/kg.

Typically, polymer (A) comprises, in addition to polar end groups of formula —CH$_2$—OH, non-polar end groups, including groups of any of formulae —CF$_2$H and —CF$_2$CH$_3$.

The total amount of end groups of any of formulae —CH$_2$—OH, —CF$_2$H and —CF$_2$CH$_3$ in the polymer (A) is advantageously of not more than 70 mmol/kg, preferably of not more than 67 mmol/kg, even more preferably of not more than 65 mmol/kg. Total amount of end groups of formulae —CH$_2$—OH, —CF$_2$H and —CF$_2$CH$_3$ in the above indicated range is representative of polymers (A) having linear structure and high molecular weight, as required for the hereby intended field of use.

As said, dispersion (D) is substantially free from fluorinated surfactants.

The expression "substantially free" in combination with the amount of fluorinated surfactants in dispersion (D) is to be meant to exclude the presence of any significant amount of said fluorinated surfactants, e.g. requiring the fluorinated surfactants to be present in an amount of less than 5 ppm, preferably of less than 3 ppm, more preferably of less than 1 ppm, with respect to the total weight of dispersion (D).

The aqueous emulsion polymerization process as detailed above is typically carried out in the presence of at least one radical initiator.

Polymerization pressure ranges typically between 20 and 70 bar, preferably between 25 and 65 bar.

While the choice of the persulfate radical initiator is not particularly limited, it is understood that radical initiators suitable for an aqueous emulsion polymerization process are selected from compounds capable of initiating and/or accelerating the polymerization process and include, but are not limited to, sodium, potassium and ammonium persulfates.

One or more radical initiators as defined above may be added to the aqueous medium as defined above in an amount ranging advantageously from 0.001% to 20% by weight based on the weight of the aqueous medium.

As said, the method is carried out with no addition of a fluorinated surfactant (FS) complying with formula (III) here below:

$$R_{fS}(X)_k(M^+)_k \quad \text{(III)}$$

wherein:
  $R_{fS}$ is selected from a C$_5$-C$_{16}$ (per)fluoroalkyl chain, optionally comprising one or more catenary or non-catenary oxygen atoms, and a (per)fluoropolyoxyalkyl chain,
  X$^-$ is selected from —COO$^-$, —PO$_3^-$ and —SO$_3^-$,
  M$^+$ is selected from NH$_4^+$ and an alkaline metal ion, and
  k is 1 or 2.

Non-limitative examples of fluorinated surfactants (FS) whose presence is substantially avoided in dispersion (D) are the followings:
  (a) CF$_3$(CF$_2$)$_{n0}$COOM', wherein n$_0$ is an integer ranging from 4 to 10, preferably from 5 to 7, preferably n$_1$ being equal to 6, and M' represents NH$_4$, Na, Li or K, preferably NH$_4$;
  (b) T-(C$_3$F$_6$O)$_{n1}$(CFXO)$_{m1}$CF$_2$COOM", wherein T represents a Cl atom or a perfluoroalkoxyde group of formula C$_x$F$_{2x+1-x'}$Cl$_{x'}$O, wherein x is an integer ranging from 1 to 3 and x' is 0 or 1, n$_1$ is an integer ranging from 1 to 6, m$_1$ is an integer ranging from 0 to 6, M" represents NH$_4$, Na, Li or K and X represents F or —CF$_3$;

(c) F—$(CF_2CF_2)_{n2}$—$CH_2$—$CH_2$—$RO_3M''$, in which R is a phosphorus or a sulphur atom, preferably R being a sulphur atom, M'' represents $NH_4$, Na, Li or K and $n_2$ is an integer ranging from 2 to 5, preferably $n_2$ being equal to 3;

(d) A-$R_{bf}$—B bifunctional fluorinated surfactants, wherein A and B, equal to or different from each other, have formula —$(O)_pCFX''$—$COOM^*$, wherein $M^*$ represents $NH_4$, Na, Li or K, preferably $M^*$ representing $NH_4$, X'' is F or —$CF_3$ and p is an integer equal to 0 or 1, and $R_{bf}$ is a divalent (per)fluoroalkyl or (per)fluoropolyether chain such that the number average molecular weight of A-$R_{bf}$—B is in the range of from 300 to 1800; and (e) mixtures thereof.

An aqueous electrode-forming composition may be obtained by adding and dispersing a powdery electrode material (an active substance for a battery or an electric double layer capacitor), and optional additives, such as an electroconductivity-imparting additive and/or a viscosity modifying agent, into the dispersion (D), as above detailed.

Also an object of the invention is thus an aqueous electrode-forming composition comprising dispersion (D), as above detailed, a powdery electrode material and, optionally, an electroconductivity-imparting additive and/or a viscosity modifying agent.

Among viscosity modifying agents, a thickener may be added in order to prevent or slow down the settling of the powdery electrode material from the aqueous composition of the invention. Non-limitative examples of suitable thickeners include, notably, organic thickeners such as partially neutralized poly(acrylic acid) or poly(methacrylic acid), carboxylated alkyl cellulose like carboxylated methyl cellulose and inorganic thickeners such as natural clays like montmorillonite and bentonite, manmade clays like laponite and others like silica and talc.

In the case of forming a positive electrode for a lithium ion battery, the active substance may comprise a composite metal chalcogenide represented by a general formula of $LiMY_2$, wherein M denotes at least one species of transition metals such as Co, Ni, Fe, Mn, Cr and V; and Y denotes a chalcogen, such as O or S. Among these, it is preferred to use a lithium-based composite metal oxide represented by a general formula of $LiMO_2$, wherein M is the same as above. Preferred examples thereof may include: $LiCoO_2$, $LiNiO_2$, $LiNi_xCo_{1-x}O_2$ (0<x<1), and spinel-structured $LiMn_2O_4$.

In the case of forming a negative electrode for a lithium battery, the active substance may preferably comprise a carbonaceous material, such as graphite, activated carbon or a carbonaceous material obtained by carbonization of phenolic resin, pitch, etc. The carbonaceous material may preferably be used in the form of particles having an average diameter of ca. 0.5-100 μm.

An electroconductivity-imparting additive may be added in order to improve the conductivity of a resultant composite electrode layer formed by applying and drying of the electrode-forming composition of the present invention, particularly in case of using an active substance, such as $LiCoO_2$, showing a limited electron-conductivity. Examples thereof may include: carbonaceous materials, such as carbon black, graphite fine powder and fiber, and fine powder and fiber of metals, such as nickel and aluminum.

The active substance for an electric double layer capacitor may preferably comprise fine particles or fiber, such as activated carbon, activated carbon fiber, silica or alumina particles, having an average particle (or fiber) diameter of 0.05-100 μm and a specific surface area of 100-3000 $m^2/g$, i.e., having a relatively small particle (or fiber) diameter and a relatively large specific surface area compared with those of active substances for batteries.

The preferred electrode-forming composition for positive electrodes comprises:

(a) polymer (A), in an amount from 1 to 10% wt, preferably from 2 to 9% wt, more preferably about 3% wt, with respect to the total weight (a)+(b)+(c);

(b) carbon black as electroconductivity-imparting additive, in an amount from 2 to 10% wt, preferably from 4 to 6% wt, more preferably about 5% wt, with respect to the total weight (a)+(b)+(c);

(c) a powdery electrode material, preferably a composite metal chalcogenide represented by a general formula of $LiMY_2$, as above detailed, in an amount from 80 to 97% wt, preferably from 85 to 94% wt, more preferably about 92% wt.

An aqueous coating composition suitable for coating separators can be obtained by adding and dispersing a non-electroactive inorganic filler material, and optional additives, into the dispersion (D), as above detailed.

Also an object of the invention is thus an aqueous coating composition [composition (AC)] comprising dispersion (D), as above detailed, at least one non-electroactive inorganic filler material and, optionally, one or more than one additional additive.

By the term "non-electroactive inorganic filler material", it is hereby intended to denote an electrically non-conducting inorganic filler material which is suitable for the manufacture of an electrically insulating separator for electrochemical cells.

The non-electroactive inorganic filler material in the separator according to the invention typically has an electrical resistivity (p) of at least $0.1 \times 10^{10}$ ohm cm, preferably of at least $0.1 \times 10^{12}$ ohm cm, as measured at 20° C. according to ASTM D 257. Non-limitative examples of suitable non-electroactive inorganic filler materials include, notably, natural and synthetic silicas, zeolites, aluminas, titanias, metal carbonates, zirconias, silicon phosphates and silicates and the like. The non-electroactive inorganic filler material is typically under the form of particles having an average size of from 0.01 μm to 50 μm, as measured according to ISO 13321.

Optional additives in composition (AC) include notably viscosity modifiers, as detailed above, anti-foams, non-fluorinated surfactants, and the like.

Among non-fluorinated surfactants, mention can be made of non-ionic emulsifiers, such as notably alkoxylated alcohols, e.g. ethoxylates alcohols, propoxylated alcohols, mixed ethoxylated/propoxylated alcohols; of anionic surfactants, including notably fatty acid salts, alkyl sulfonate salts (e.g. sodium dodecyl sulfate), alkylaryl sulfonate salts, arylalkyl sulfonate salts, and the like.

The composition (AC) may be obtained from the dispersion (D), e.g. (i) by formulating dispersion (D) with optional additives, as above detailed, (ii) by upconcentrating dispersion (D), notably through standard techniques like ultrafiltration, clouding, and the like, (iii) by using dispersion (D) as such, as obtained from emulsion polymerization, (iv) by diluting dispersion (D) with water, or through a combination of above techniques.

Generally, the composition (AC) is obtained by mixing:
(i) dispersion (D), as above detailed, in an amount of from 5 to 25% wt;
(ii) at least one non-electroactive inorganic filler material, in an amount of from 70 to 95% wt;
(iii) one or more than one additional additive, in an amount of 0 to 5% wt; and optionally, adding water for adjusting solid contents in the range of 30 to 80% wt, preferably 40 to 60% wt.

The solid contents of the composition (AC) is understood to be cumulative of all non-volatile ingredients thereof, notably including polymer (A) and non-electroactive inorganic filler material.

Still another object of the present invention is a method for the manufacture of a composite separator notably suitable for use in an electrochemical cell, said method comprising the following steps:

(i) providing a porous substrate;

(ii) providing an aqueous coating composition comprising dispersion (D), as above detailed, at least one non-electroactive inorganic filler material and, optionally, at least one or more than one additional additive, i.e. the composition (AC), as above detailed;

(iii) applying said composition (AC) onto at least one surface of said porous substrate to provide a coating composition layer; and (iv) drying said coating composition layer at a temperature of at least 60° C., to provide said composite separator.

By the term "separator", it is hereby intended to denote a porous polymeric material which electrically and physically separates electrodes of opposite polarities in an electrochemical cell and is permeable to ions flowing between them.

By the term "electrochemical cell", it is hereby intended to denote an electrochemical cell comprising a positive electrode, a negative electrode and a liquid electrolyte, wherein a monolayer or multilayer separator is adhered to at least one surface of one of said electrodes.

Non-limitative examples of electrochemical cells include, notably, batteries, preferably secondary batteries, and electric double layer capacitors.

For the purpose of the present invention, by "secondary battery" it is intended to denote a rechargeable battery. Non-limitative examples of secondary batteries include, notably, alkaline or alkaline-earth secondary batteries.

The composite separator obtained from the method of the invention is advantageously an electrically insulating composite separator suitable for use in an electrochemical cell.

In step (iii) of the method of the invention, the composition (AC) is typically applied onto at least one surface of the porous substrate by a technique selected from casting, spray coating, roll coating, doctor blading, slot die coating, gravure coating, ink jet printing, spin coating and screen printing, brush, squeegee, foam applicator, curtain coating, vacuum coating.

Non-limitative examples of suitable porous substrate include, notably, porous membranes made from inorganic, organic and naturally occurring materials, and in particular made from nonwoven fibers (cotton, polyamides, polyesters, glass), from polymers (polyethylene, polypropylene, poly(tetrafluoroethylene), poly(vinyl chloride), and from certain fibrous naturally occurring substances (e.g. asbestos).

Advantageous results have been obtained when the porous support was a polyolefin porous support, e.g. a polyethylene or a polypropylene porous support.

In step (iv) of the method of the invention, the coating composition layer is dried preferably at a temperature comprised between 60° C. and 200° C., preferably between 70° C. and 180° C.

Should the disclosure of any patents, patent applications, and publications which are incorporated herein by reference conflict with the description of the present application to the extent that it may render a term unclear, the present description shall take precedence.

The invention is described hereunder in more detail with reference to the following example, which are provided with the purpose of merely illustrating the invention, with no intention to limit its scope.

Determination of Polar End Groups $^1$H-NMR technique has been used for determination of end groups according to the technique described in PIANCA, Maurizio, et al. End Groups in fluoropolymers. *Journal of Fluorine Chemistry*. 1999, vol. 95, p. 71-84. To this aim, about 20 mg of polymer were dissolved in 0.7 ml of hexadeuteroacetone. The $^1$H-NMR spectrum revealed notably a triplet at 3.78 ppm with a J coupling F—H equal to 14 Hz that is related to —CH$_2$—OH end group.

Determination of Total Average Monomer (MA) Content

Total average monomer (MA) content in vinylidene fluoride (VDF) polymers was determined by acid-base titration.

A sample of 1.0 g of polymer was dissolved in acetone at a temperature of 70° C. Water (5 ml) was then added dropwise under vigorous stirring so as to avoid coagulation of the polymer. Titration with aqueous NaOH having a concentration of 0.01 N until complete neutralization of acidity was then carried out, with neutrality transition at about −170 mV.

Determination of Melt Viscosity

Melt Viscosity (According to ASTM D3835) was measured to demonstrate the improvement of molecular weight. The test was performed in a Capillary Reomether Rheograph 2003 in a configuration (L/D=20) at 230° C. with a die diameter of 1 mm. Measure of shear rate η (eta) were performed at 100 sec$^{-1}$.

Example 1—Manufacture of Aqueous VDF-HFP-AA Polymer Latex—Polymer A

In a 21 lt. horizontal reactor autoclave equipped with baffles and stirrer working at 50 rpm, 13.5 lt. of deionised water were introduced. The temperature is brought to 80° C. and the pressure of 35 Bar ass was maintained constant throughout the whole trial by feeding VDF/HFP gaseous mixture monomers in a mol ration of 99:1 respectively. 250 ml of a 100 g/l aqueous solution of ammonium persulfate (APS) were added over a period of 15 minutes (1 L/h) then the solution of ammonium persulfate (APS) was continuously added at a flux rate of 60 ml/h for the whole duration of the run; in addition, 50 ml of a solution of acrylic acid (AA) (50 g/l of acrylic acid in water) were fed every 250 g of monomers consumed.

When 4500 g of the mixture were fed, the feeding mixture was interrupted, then the pressure was let to fall down up to 12 bar while keeping the reaction temperature constant. Final reaction time was 223 min.

The reactor was cooled to room temperature and latex was recovered. The VDF-HFP-AA polymer so obtained contained 98.3% by moles of VDF, about 1.0% by moles of HFP and 0.7% by moles of acrylic acid (AA) monomer.

The aqueous latex so obtained had a solid content of 24.8% by weight. The VDF-HFP-AA polymer was dispersed in the aqueous latex under the form of particles having an average primary size of 243 nm, as measured according to ISO 13321, was found to possess a melting point of 153.6° C. (determined according to ASTM D3418) a MV (230° C./100 sec$^{-1}$) of 67 kPoise and a content of end groups as follows: —CF$_2$H: 35 mmol/kg; —CF$_2$—CH$_3$: 19 mmol/kg; —CH$_2$OH: 8 mmol/kg.

Comparative Example 1—Manufacture of Aqueous VDF-AA Polymer Latex—Polymer A'

In a 21 lt. horizontal reactor autoclave equipped with baffles and stirrer working at 50 rpm, 13.5 lt. of deionised water were introduced. The temperature is brought to 90° C. and the pressure of 20 Bar ass was maintained constant throughout the whole trial by feeding VDF gaseous monomer. 15 ml of a 100 g/l aqueous solution of ammonium persulfate (APS) were added over a period of 5 minutes (200 ml/h) and at the same time 22 ml of a solution of acrylic acid (AA) (40 g/l of acrylic acid in water) were fed every 225 g of polymer synthesized.

After 30 minutes, additional amount of solution of APS was added at a flux rate of 240 ml/h for the whole duration of the run. When 4500 g of the mixture were fed, the feeding mixture was interrupted, then the pressure was let to fall down up to 12 bar while keeping the reaction temperature constant. Final reaction time was 164 min.

The reactor was cooled to room temperature and the latex recovered. The VDF-AA polymer so obtained contained 99.55% by moles of VDF and 0.45% by moles of acrylic acid (AA) monomer.

The aqueous latex so obtained had a solid content of 24.2% by weight. The VDF-AA polymer was dispersed in the aqueous latex under the form of particles having an average primary size of 189 nm, as measured according to ISO 13321, was found to possess a melting point of 160° C. (determined according to ASTM D3418) and a MV (230° C./100 sec$^{-1}$) of 23 kPoise.

Example 2—Manufacture of Aqueous
VDF-HFP-AA Polymer Latex—Polymer B

In a 2 l lt. horizontal reactor autoclave equipped with baffles and stirrer working at 50 rpm, 13.5 lt. of deionised water were introduced. The temperature is brought to 75° C. and the pressure of 35 Bar ass was maintained constant throughout the whole trial by feeding VDF/HFP gaseous mixture monomers in a mol ration of 99:3 respectively. 290 ml of a 100 g/l aqueous solution of ammonium persulfate (APS) were added over a period of 17 minutes (1 L/h), and the solution of APS was then fed at a flux rate of 60 ml/h for the whole duration of the run; 50 ml of a solution of acrylic acid (AA) (50 g/l of acrylic acid in water) were fed every 250 g of monomers consumed. When 4500 g of the mixture were fed, the feeding mixture was interrupted, then the pressure was let to fall down up to 12 bar while keeping the reaction temperature constant. Final reaction time was 318 min.

The reactor was cooled to room temperature, the latex unloaded. The VDF-HFP-AA polymer so obtained contained 96.13% by moles of VDF, 2.97% by moles of HFP and 0.9% by moles of acrylic acid (AA) monomer.

The aqueous latex so obtained had a solid content of 24.0% by weight. The VDF-HFP-AA polymer was dispersed in the aqueous latex under the form of particles having an average primary size of 287 nm, as measured according to ISO 13321, was found to possess a melting point of 144° C. (determined according to ASTM D3418), a MV (230° C./100 sec$^{-1}$) of 31 kPoise, and a content of end groups as follows: —CF$_2$H: 35 mmol/kg; —CF$_2$—CH$_3$: 23 mmol/kg; —CH$_2$OH: 5 mmol/kg.

Comparative Example 2—Manufacture of Aqueous
VDF-HFP-AA Polymer Latex—Polymer B'

In a 2 l lt. horizontal reactor autoclave equipped with baffles and stirrer working at 50 rpm, 13.5 lt. of deionised water were introduced. The temperature was brought to 90° C. and the pressure of 30 Bar ass was maintained constant throughout the whole trial by feeding VDF/HFP gaseous mixture monomers in a molar ratio of 99:3 respectively. 250 ml of a 100 g/l aqueous solution of ammonium persulfate (APS) were added over a period of 15 minutes (1 L/h) and at the same time 50 ml of a solution of acrylic acid (AA) (50 g/l of acrylic acid in water) were fed every 250 g of polymer synthesized.

After 30 minutes, the solution of APS was fed at a flux rate of 240 ml/h for the whole duration of the run.

When 4500 g of the mixture were fed, the feeding mixture was interrupted, the pressure was let to fall down up to 12 bar while keeping the reaction temperature constant. Final reaction time was 125 min.

The reactor was cooled to room temperature, the latex was recovered. The VDF-HFP-AA polymer so obtained contained 96.13% by moles of VDF, 2.97% by moles of HFP and 0.9% by moles of acrylic acid (AA) monomer.

The aqueous latex so obtained had a solid content of 25.4% by weight. The VDF-HFP-AA polymer was dispersed in the aqueous latex under the form of particles having an average primary size of 220 nm, as measured according to ISO 13321, was found to possess a melting point of 141° C. (determined according to ASTM D3418), a MV (230° C./100 sec$^{-1}$) of 22 kPoise.

Example 3—Manufacture of Aqueous
VDF-HFP-AA Polymer Latex—Polymer C

In a 2 l lt. horizontal reactor autoclave equipped with baffles and stirrer working at 50 rpm, 13.5 lt. of deionised water were introduced. The temperature was brought to 75° C. then HFP gaseous monomer is charge till obtain deltaP of 6.1 bar. The pressure of 35 bar was maintained constant throughout the whole trial by feeding VDF/HFP gaseous mixture monomers in a molar ratio of 87.5:12.5 respectively. 250 ml of a 100 g/l aqueous solution of ammonium persulfate (APS) were added over a period of 15 minutes (1 L/h) then continue to add the solution of ammonium persulfate (APS) with a flux rate of 60 ml/h for the whole duration of the trial together with 50 ml of a solution of acrylic acid (AA) (50 g/l of acrylic acid in water) were fed every 250 g of polymer synthesized.

When 4500 g of the mixture were fed, the feeding mixture was interrupted, then the pressure was let to fall down up to 12 bar while keeping the reaction temperature constant. Final reaction time was 326 min. The reactor was cooled to room temperature, the latex was unloaded. The VDF-HFP-AA polymer so obtained contained 86.72% moles of VDF, 12.38% moles of HFP and 0.9% by moles of acrylic acid (AA) monomer. The aqueous latex so obtained had a solid content of 25.6% by weight. The VDF-HFP-AA polymer was dispersed in the aqueous latex under the form of particles having an average primary size of 273 nm, as measured according to ISO 13321, was found to possess a melting point of 89° C. (determined according to ASTM D3418), a MV (230° C./100 sec$^{-1}$) of 48.6 kPoise, and a content of end groups as follows: —CF$_2$H: 29 mmol/kg; —CF$_2$—CH$_3$: 10 mmol/kg; —CH$_2$OH: 7 mmol/kg.

Comparative Example 3—Manufacture of Aqueous
VDF-HFP-AA Polymer Latex—Polymer C'

In a 2 l lt. horizontal reactor autoclave equipped with baffles and stirrer working at 50 rpm, 13.5 lt. of deionised water were introduced. The temperature was brought to 90° C. and the pressure of 30 Bar was maintained constant throughout the whole trial by feeding VDF/HFP gaseous mixture monomers in a molar ratio of 87.5:12.5 respectively.

250 ml of a 100 g/l aqueous solution of ammonium persulfate (APS) were added over a period of 15 minutes (1 L/h) and at the same time 50 ml of a solution of acrylic acid (AA) (50 g/l of acrylic acid in water) were fed every 250 g of polymer synthesized.

After 30 minutes from the ignition restart to add the solution of ammonium persulfate (APS) with a flux rate of 240 ml/h for the whole duration of the trial.

When 4500 g of the mixture were fed, the feeding mixture was interrupted, then the pressure was let to fall down up to 12 bar while keeping the reaction temperature constant. Final reaction time was 141 min.

The reactor was cooled to room temperature, the latex was unloaded. The VDF-HFP-AA polymer so obtained contained 86.7% moles of VDF, 12.4% moles of HFP and 0.9% by moles of acrylic acid (AA) monomer. The aqueous latex so obtained had a solid content of 23.8% by weight. The VDF-HFP-AA polymer was dispersed in the aqueous latex under the form of particles having an average primary size of 340 nm, as measured according to ISO 13321, was found to possess a melting point of 81.2° C. (determined according to ASTM D3418) and a MV (230° C./100 sec$^{-1}$) of 14 kPoise.

Comparative Example 4—Manufacture of Aqueous VDF-HFP-AA Polymer Latex—Polymer D'

In a 21 lt. horizontal reactor autoclave equipped with baffles and stirrer working at 50 rpm, 13.5 lt. of deionised water were introduced. The temperature was brought to 90° C. then HFP gaseous monomer is charge till obtain deltaP of 10.6 bar. The pressure of 35 bar was maintained constant throughout the whole trial by feeding VDF/HFP gaseous mixture monomers in a mol ration of 78.5:21.5 respectively. 220 ml of a 100 g/l aqueous solution of ammonium persulfate (APS) were added over a period of 13 minutes (1 L/h) then continue to add the solution of ammonium persulfate (APS) with a flux rate of 60 ml/h for the whole duration of the trial together with 50 ml of a solution of acrylic acid (AA) (50 g/l of acrylic acid in water) were fed every 250 g of polymer synthesized.

The temperature of polymerization was reduced to 75° C. after 450 g of conversion.

When 4500 g of the mixture were fed, the feeding mixture was interrupted, then the pressure was let to fall down up to 12 bar while keeping the reaction temperature constant. Final reaction time was 269 min.

The reactor was cooled to room temperature, the latex was unloaded. The VDF-HFP-AA polymer so obtained contained 77.8% by moles of VDF, 21.3% by moles of HFP and 0.9% by moles of acrylic acid (AA) monomer.

The aqueous latex so obtained had a solid content of 25.7% by weight. The VDF-HFP-AA polymer was dispersed in the aqueous latex under the form of particles having an average primary size of 292 nm, as measured according to ISO 13321, was found to possess a Tg=−21.1° C. (determined according to ASTM D3418), a MV (230° C./100 sec$^{-1}$) of 40 kPoise and Mooney ((1+10')@121° C.) of 158.1, and a content of end groups as follows: —CF$_2$H: 25 mmol/kg; —CF$_2$—CH$_3$: 37 mmol/kg; —CH$_2$OH: 7 mmol/kg.

Comparative Example 5—Manufacture of Aqueous VDF-HFP-AA Polymer Latex—Polymer D"

In a 21 lt. horizontal reactor autoclave equipped with baffles and stirrer working at 50 rpm, 13.5 lt. of deionised water were introduced. The temperature was brought to 90° C. then HFP gaseous monomer is charge till obtain deltaP of 8.8 bar. The pressure of 30 Bar ass was maintained constant throughout the whole trial by feeding VDF/HFP gaseous mixture monomers in a molar ratio of 78.5:21.5 respectively. 250 ml of a 100 g/l aqueous solution of ammonium persulfate (APS) were added over a period of 15 minutes (1 L/h) and at the same time 50 ml of a solution of acrylic acid (AA) (50 g/l of acrylic acid in water) were fed every 250 g of polymer synthesized.

After 30 minutes from the ignition restart to add the solution of ammonium persulfate (APS) with a flux rate of 240 ml/h for the whole duration of the trial.

When 4500 g of the mixture were fed, the feeding mixture was interrupted, then the pressure was let to fall down up to 12 bar while keeping the reaction temperature constant. Final reaction time was 285 min. The reactor was cooled to room temperature, the latex was unloaded. The VDF-HFP-AA polymer so obtained contained 77.8% by moles of VDF, 21.3% by moles of HFP and 0.9% by moles of acrylic acid (AA) monomer.

The aqueous latex so obtained had a solid content of 24% by weight. The VDF-HFP-AA polymer was dispersed in the aqueous latex under the form of particles having an average primary size of 285 nm, as measured according to ISO 13321, was found to possess a possess a Tg=−15.9° C. (determined according to ASTM D3418), a MV (230° C./100 sec$^{-1}$) of 23 kPoise and Mooney ((1+10')@121° C.) of 63.3, and a content of end groups as follows: —CF$_2$H: 68 mmol/kg; —CF$_2$—CH$_3$: 15 mmol/kg; —CH$_2$OH: 38 mmol/kg.

Properties of the latexes are summarized in Table 1 herein below:

TABLE 1

| Ex. | Polymers | VDF/HFP mol:mol | $T_m$ ° C. | MV (kPoise) @100 sec$^{-1}$ |
|---|---|---|---|---|
| Ex. 1 | A | 99:1 | 153.6 | 67 |
| Ex. 1C | A' | 100:0 | 160.0 | 23 |
| Ex. 2 | B | 97:3 | 144.0 | 31 |
| Ex. 2C | B' | 97:3 | 140.0 | 22 |
| Ex. 3 | C | 87.5:12.5 | 89.0 | 49 |
| Ex. 3C | C' | 87.5:12.5 | 81.2 | 14 |
| Ex. 4C | D' | 78.5:21.5 | (*)$T_g$ = −21.1 | 40 |
| Ex. 5C | D" | 78.5:21.5 | (*)$T_g$ = −15.9 | 23 |

(*)no detectable melting point

Preparation of Coated Separators

Emulsion polymers were used as binders for ceramic particles to create high temperature resistant coatings on polyolefin porous support so as to provide for composite separators for Li-ion batteries. A first mixture consisting of 87 wt % of alumina CR6 from Baikowski, 10 wt % of latex, 2 wt % of surfactant (sodium dodecyl sulphate, SDS) and 1 wt % of antifoam BYK-023 was prepared. Then water was added to the said mixture until achieving 50 wt % of solid content in the slurry, and the slurry was mixed at 1000 rpm for 20 min by using a planetary mixing system. Subsequently, the prescribed amount of VDF polymer latex was added to the aqueous slurry and the resulting mixture was mixed further for 2-10 min at 1000 rpm. The coating composition so obtained was casted on a porous polyolefin substrate using a casting knife set at 30 μm of blade height. The coated separator was obtained by drying at a temperature of 70° C. in a ventilated oven for 30 minutes.

Dry Lamination

The separator is laminated at cathode without the addition of any solvent. The cathode used was obtained from a composition comprising 2% wt of SOLEF(R) PVDF 5130 (polymer binder), 3% wt of Carbon Black Super C65 by Imerys (electron conductive agent) and 95% wt of Lithium Cobalt Oxide D10 from Umicore (cathode active material), and possessed a porosity of 40%. Lamination of the separator onto the cathode surface was performed using a hydraulic flat press operating in the following conditions of pressure, time and temperature: 50 MPa, 15 min and 70° C. After lamination the adhesion strength was evaluated applying a peeling test at an angle of 180° and at a delamination speed of 10 mm/min following ASTM D903 standard.

TABLE 2

| Polymers | Adhesion (N/m) |
| --- | --- |
| B' | 0.3 ± 0.1 |
| B | 0.8 ± 0.1 |
| C' | 1.8 ± 0.4 |
| C | 3.0 ± 0.4 |
| D" | 3.9 ± 1 |
| D' | 8.8 ± 1.3 |

Characterization of Composite Separator: Wet Adhesion Post 48 h in EC: DMC

Wet lamination is the evaluation of the wet adhesion of the separator to cathode with the addition of alkyl carbonate mixture solvent. The coated separators prepared as above detailed and the same cathode as above detailed, under the form of specimens having dimensions of 11 cm×8 cm, were pre-conditioned by drying at 55° C. overnight. 500 μl of a mixture of ethylene carbonate (EC) and propylene carbonate (PC) EC:DMC 1:1 were poured on cathode surface and the separator is laid on top of it. The cathode-separator assembly was closed in vacuum in a coffee bag within 2 PTFE sheets and then pressed with a flat hydraulic press at 85° C., 1 MPa, 5 min. Soon after opening the coffee bag the separator was peeled off from the cathode with a peeling angle of 180° at a peeling rate of 10 mm/min following ASTM D903. Results are summarized in the following Table.

TABLE 3

| Polymers | Adhesion (N/m) |
| --- | --- |
| B' | 11.5 ± 1.0 |
| B | 21.6 ± 1.4 |

Swelling

The swelling of polymers was evaluated by measuring the increase in weight of molded polymeric samples after immersion into a carbonate mixture. The molded specimens were obtained by compression molding, by loading the polymeric powder of coagulated lattice directly into the stainless steel frame of a flat press. The stainless steel frame used was designed to obtain 5 circular samples with diameter of 25 mm and thickness of 1.5 mm. The samples were obtained by melting the polymer at $T_m+60°$ C. and then cooling at room temperature.

The circular polymeric samples (ϕ=25 mm; 1.5 mm thick) were dried at 55° C. overnight and then immersed in EC (ethylene carbonate):DMC (dimethyl carbonate) 1:1 mixture, after measuring the dry weight and dry thickness. The weight was measured at different time intervals from immersion into the swelling agent till the maximum uptake was reached. Results are summarized below:

TABLE 4

| Polymers | Wt increase (%) |
| --- | --- |
| B' | 129 ± 7 |
| B | 130 ± 14 |
| D" | dissolution |
| D' | dissolution |

Excessive swelling or dissolution occurs for materials D' and D" of comparison.

The invention claimed is:

1. An aqueous dispersion (D) comprising particles of polymer (A), wherein polymer (A) is a vinylidene fluoride (VDF) copolymer comprising recurring units derived from vinylidene fluoride (VDF) monomer and recurring units derived from at least one hydrophilic (meth)acrylic monomer (MA) of formula:

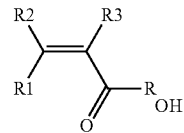

wherein each of R1, R2, R3, equal or different from each other, is independently a hydrogen atom or a $C_1$-$C_3$ hydrocarbon group, and $R_{OH}$ is a hydroxyl group or a $C_1$-$C_5$ hydrocarbon moiety comprising at least one hydroxyl group, said polymer (A)

(i) comprising more than 85.0% moles of recurring units derived from VDF and from 0.05 to 10% by moles of recurring units derived from said hydrophilic (meth)acrylic monomer (MA), with respect to the total number of recurring units of polymer (A);

(ii) possessing a melt viscosity of at least 30 kPoise, when determined at a shear rate of 100 $sec^{-1}$, and at a temperature of 230° C., according to ASTM D3835, and (iii) possessing an amount of end groups of formula —$CH_2$—OH of at least 5 mmol/kg and at most 20 mmol/kg;

wherein said dispersion is substantially free from fluorinated surfactants; and wherein the particles of polymer (A) comprise a primary particle average size of less than 1 μm as measured according to ISO13321.

2. The dispersion (D) of claim 1, wherein polymer (A) consists essentially of recurring units derived from VDF, and from monomer (MA).

3. The dispersion (D) of claim 1, wherein polymer (A) consists essentially of recurring units derived from VDF, from HFP and from monomer (MA).

4. The dispersion (D) of anyone of the preceding claims, wherein the hydrophilic (meth)acrylic monomer (MA) complies formula:

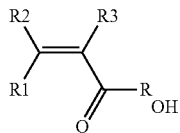

wherein each of R1, R2, equal or different from each other, is independently an hydrogen atom or a $C_1$-$C_3$ hydrocarbon group, and R3 is hydrogen and $R_{OH}$ is a hydroxyl group or a $C_1$-$C_5$ hydrocarbon moiety comprising at least one hydroxyl group.

5. The dispersion (D) of claim 4, wherein the monomer (MA) is selected from the group consisting of:
hydroxyethylacrylate (HEA) of formula:

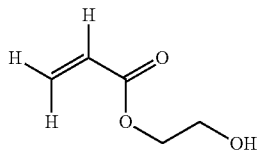

2-hydroxypropyl acrylate (HPA) of either of formulae:

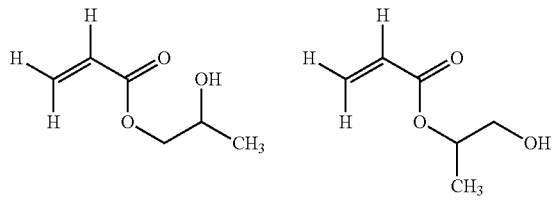

acrylic acid (AA) of formula:

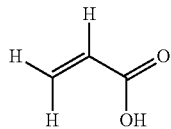

and mixtures thereof.

6. The dispersion (D) of claim 1, wherein polymer (A) comprises at least 0.1, % moles of recurring units derived from said hydrophilic (meth)acrylic monomer (MA) and/or polymer (A) comprises at most 7.5% moles of recurring units derived from said hydrophilic (meth)acrylic monomer (MA).

7. The dispersion (D) according to claim 1, wherein polymer (A) possesses a melt viscosity (MV) of no more than 100 kPoise when determined at a shear rate of 100 $sec^{-1}$, and at a temperature of 230° C., according to ASTM D3835.

8. The dispersion (D) according to claim 1, wherein polymer (A) comprises an amount of polar end groups of formula —$CH_2OH$ of at least 5 mmol/kg and at most 18 mmol/kg.

9. A method of making the dispersion (D) of claim 1, said method comprising emulsion polymerizing VDF and said hydrophilic (meth)acrylic monomer (MA) in the presence of a persulfate inorganic initiator, at a temperature of at most 80° C., under a pressure of at least 20 bar, without adding any fluorinated surfactant.

10. An aqueous electrode-forming composition comprising the dispersion (D) according to claim 1, a powdery electrode material, and, optionally an electroconductivity-imparting additive and/or a viscosity modifying agent.

11. An aqueous coating composition (AC) comprising dispersion (D) according to claim 1, at least one non-electroactive inorganic filler material and, optionally, one or more than one additional additive.

12. The composition (AC) of claim 11, wherein the non-electroactive inorganic filler material is selected from the group consisting of natural and synthetic silicas, zeolites, aluminas, titanias, metal carbonates, zorconias, silicon phosphates and silicates.

13. The composition (AC) of claim 11, wherein the composition includes at least one additional additive selected from the group consisting of viscosity modifiers, anti-foams, and non-fluorinated surfactants, and anionic surfactants.

14. The composition (AC) according to claim 11, said composition (AC) being obtained by:
mixing:
(i) dispersion (D) in an amount of from 5 to 25% wt;
(ii) at least one non-electroactive inorganic filler material, in an amount of from 70 to 95% wt; and
(iii) one or more than one additional additive, in an amount of 0 to 5% wt; and optionally, adding water for adjusting solid contents in the range of 30 to 80% wt.

15. A method for the manufacture of a composite separator suitable for use in an electrochemical cell, said method comprising:
applying the composition (AC) as defined in claim 11 onto at least one surface of a porous substrate to provide a coating composition layer; and
drying said coating composition layer at a temperature of at least 60° C., to provide said composite separator.

16. The dispersion (D) of claim 4, wherein each of R1, R2, R3 are hydrogen, and $R_{OH}$ is a hydroxyl group or a $C_1$-$C_5$ hydrocarbon moiety comprising at least one hydroxyl group.

17. The dispersion (D) of claim 6, wherein polymer (A) comprises at least 0.2% moles and at most 3% moles of recurring units derived from said hydrophilic (meth)acrylic monomer (MA).

18. The dispersion (D) according to claim 7, wherein polymer (A) possesses a melt viscosity (MV) of less than 80 kPoise, when determined at a shear rate of 100 $sec^{-1}$, and at a temperature of 230° C., according to ASTM D3835.

19. The dispersion (D) according to claim 8, wherein polymer (A) comprises an amount of polar end groups of formula —$CH_2OH$ of at least 5 mmol/kg and at most 12 mmol/kg.

20. The composition (AC) of claim 13, wherein the at least one additional additive is selected from the group consisting of non-ionic emulsifiers, alkoxylated alcohols, ethoxylated alcohols, propoxylated alcohols, mixed ethoxylated/propoxylated alcohols, fatty acid salts, alkyl sulfonate salts, sodium dodecyl sulfate, alkylaryl sulfonate salts and arylalkyl sulfonate salts.

* * * * *